United States Patent
Hamada

(10) Patent No.: US 10,457,213 B2
(45) Date of Patent: Oct. 29, 2019

(54) DOOR MIRROR DEVICE AND DOOR MIRROR DEVICE MANUFACTURING METHOD

(71) Applicant: KABUSHIKI KAISHA TOKAI-RIKA-DENKI-SEISAKUSHO, Aichi-ken (JP)

(72) Inventor: Takehiro Hamada, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/612,401

(22) Filed: Jun. 2, 2017

(65) Prior Publication Data

US 2017/0355310 A1    Dec. 14, 2017

(30) Foreign Application Priority Data

Jun. 10, 2016 (JP) .................................. 2016-116484

(51) Int. Cl.
*B60R 1/06* (2006.01)

(52) U.S. Cl.
CPC ...................... *B60R 1/06* (2013.01)

(58) Field of Classification Search
CPC .................................. B60R 1/078; B60R 1/06
USPC .................................. 359/871, 872, 877, 841
See application file for complete search history.

(56) References Cited

U.S. PATENT DOCUMENTS

2011/0205747 A1*  8/2011  Suzuki ................. B60Q 1/2665
                                                              362/487

FOREIGN PATENT DOCUMENTS

| JP | 2006-290184 A | 10/2006 |
| JP | 2012-116225 A | 6/2012 |
| JP | 2013112298 A | 6/2013 |

OTHER PUBLICATIONS

Extended European Search Report issued in the corresponding EP application No. 17174671.2 dated Oct. 16, 2017.

* cited by examiner

*Primary Examiner* — Stephone B Allen
*Assistant Examiner* — Rahman Abdur
(74) *Attorney, Agent, or Firm* — Roberts Mlotkowski Safran Cole & Calderon P.C.

(57) ABSTRACT

Fixed-to portions of a visor cover are fixed to fixing portions of a bracket. Engagement hooks of the visor cover are disposed at back sides of outer peripheral end portions of a visor rim. When the fixed-to portions are caused to abut abutting portions of the bracket and the visor rim, the engagement hook is separated from the outer peripheral end portion in a vehicle width direction and the engagement hook is separated from the outer peripheral end portion in a vehicle front-rear direction. Thus, the fixed-to portions are caused to abut the abutting portions and are moved toward the fixing portions, enabling rubbing of the engagement hook and the engagement hook against the outer peripheral end portion and the outer peripheral end portion to be suppressed.

6 Claims, 5 Drawing Sheets

DOOR MIRROR DEVICE AND DOOR MIRROR DEVICE MANUFACTURING METHOD

CROSS-REFERENCE TO RELATED APPLICATION

This application claims priority under 35 USC 119 from Japanese Patent Application No. 2016-116484 filed Jun. 10, 2016, the disclosure of which is incorporated by reference herein.

BACKGROUND

Field of the Invention

The present invention relates to a door mirror device and a door mirror device manufacturing method.

Related Art

Japanese Patent Application Laid-Open (JP-A) No. 2012-116225 describes a vehicle door mirror device. The vehicle door mirror is provided with a visor rim and a visor cover, and the visor rim and the visor cover configure a casing. The visor cover is disposed on a vehicle front side of the visor rim.

When assembling the visor cover to the visor rim, it is desirable to suppress the visor rim and the visor cover from being scratched during an assembly operation.

SUMMARY

In consideration of the above circumstances, a door mirror device and a door mirror device manufacturing method capable of suppressing scratching during an assembly operation is obtained.

A door mirror device according to a first aspect includes: a first structural body that configures a casing covering a mirror provided at a vehicle door, and that is provided with a first facing portion and a second facing portion; a second structural body that configures the casing, and that is provided with a first disposition portion disposed at a back side of the first facing portion so as to face the first facing portion in a first direction and a second disposition portion disposed at a back side of the second facing portion so as to face the second facing portion in a second direction; a fixing portion that is provided at the first structural body; a fixed-to portion that is provided at the second structural body and that is fixed to the fixing portion; and an abutting portion that is provided at the first structural body and that is disposed at a second direction side of the fixing portion, the abutting portion being configured such that the first disposition portion is separated from the first facing portion on the second direction side and the second disposition portion is separated from the second facing portion on a first direction side when the fixed-to portion is abutted to the abutting portion.

According to the first aspect, the first structural body and the second structural body configure the casing, and the casing covers a mirror provided to the vehicle door. The fixing portion is provided to the first structural body, and the fixed-to portion is provided to the second structural body, and the fixed-to portion is fixed to the fixing portion. In addition to the first structural body, the first disposition portion and the second disposition portion are provided to the second structural body, and the first disposition portion and the second disposition portion are respectively disposed at the back sides of the first facing portion and the second facing portion. The first facing portion and the first disposition portion face each other in the first direction, and the second facing portion and the second disposition portion face each other in the second direction.

Note that the abutting portion is provided to the first structural body, and the abutting portion is disposed at the second direction side of the fixing portion. When the fixed-to portion is caused to abut the abutting portion, the first disposition portion is separated from the first facing portion in the second direction side and the second disposition portion is separated from the second facing portion in the first direction side. Thus, the fixed-to portion is caused to abut the abutting portion so as to be in a state in which the first disposition portion and the second disposition portion are respectively separated from the first facing portion and the second facing portion, and, from this state, the fixed-to portion is moved toward the fixing portion, so the first disposition portion and the second disposition portion are respectively disposed at the back sides of the first facing portion and the second facing portion. This enables rubbing of the first disposition portion and the second disposition portion against respective surfaces of the first facing portion and the second facing portion to be suppressed. Namely, scratches can be suppressed from occurring on the surface of the first structural body.

A second aspect is the door mirror device according to the first aspect, further including a guide portion that is provided at the first structural body and that guides the fixed-to portion to the fixing portion.

According to the second aspect, the guide portion is provided to the first structural body. Since the guide portion guides the fixed-to portion to the fixing portion, it becomes easier to dispose the fixed-to portion at the fixing portion. Namely, it becomes easier to dispose the second structural body at a preset position.

A third aspect is the door mirror device according to the first aspect or the second aspect, wherein three fixed-to portions are provided at the second structural body, and are disposed at positions respectively forming apexes of a triangular shape in a vehicle front view.

According to the third aspect, three of the fixed-to portions are provided to the second structural body. The three fixed-to portions are disposed at positions respectively forming vertices of a triangular shape in a vehicle face-on view. Accordingly, since the second structural body is stabilized in a state in which the fixed-to portions are abutted against the fixing portions, the second structural body can be stably fixed to the first structural body when assembling the second structural body to the first structural body.

A door mirror device manufacturing method according to a fourth aspect is for a door mirror device (applied to a door mirror device) including a first structural body that configures a casing covering a mirror provided at a vehicle door, and that is provided with a first facing portion and a second facing portion, a second structural body that configures the casing, and that is provided with a first disposition portion disposed at a back side of the first facing portion so as to face the first facing portion in a first direction and a second disposition portion disposed at a back side of the second facing portion so as to face the second facing portion in a second direction, a fixing portion that is provided at the first structural body, a fixed-to portion that is provided at the second structural body and that is fixed to the fixing portion, and an abutting portion that is provided at the first structural body and that is disposed at a second direction side of the fixing portion, the door mirror device manufacturing method including: separating the first disposition portion from the first facing portion on the second direction side and separating the second disposition portion from the second facing portion on a first direction side by abutting the fixed-to portion to the abutting portion; and disposing the first disposition portion and the second disposition portion at the back side of the first facing portion and the back side of the second facing portion, respectively, by moving the fixed-to portion to the fixing portion.

According to the fourth aspect, by the fixed-to portion being caused to abut against the abutting portion, the first disposition portion is separated from the first facing portion in the second direction side and the second disposition portion is separated from the second facing portion in the first direction side. Thereafter, by the fixed-to portion being moved toward the fixing portion, the first disposition portion and the second disposition portion are respectively disposed at the back sides of the first facing portion and the second facing portion. Thus, rubbing of the first disposition portion and the second disposition portion against respective surfaces of the first facing portion and the second facing portion can be suppressed. Namely, scratches can be suppressed from occurring at surfaces of the first structural body and the second structural body.

The door mirror device according to the first aspect has the excellent advantageous effect of enabling scratching during an assembly operation to be suppressed.

The door mirror device according to the second aspect has the excellent advantageous effect of enabling the ease of an assembly operation to be improved.

The door mirror device according to the third aspect has the excellent advantageous effect of enabling the ease of an assembly operation to be further improved.

The door mirror device manufacturing method according to the fourth aspect has the excellent advantageous effect of enabling scratching during an assembly operation to be suppressed.

BRIEF DESCRIPTION OF THE DRAWINGS

Exemplary embodiment will be described in detail with reference to the following figures, wherein.

DETAILED DESCRIPTION

Figure 1:
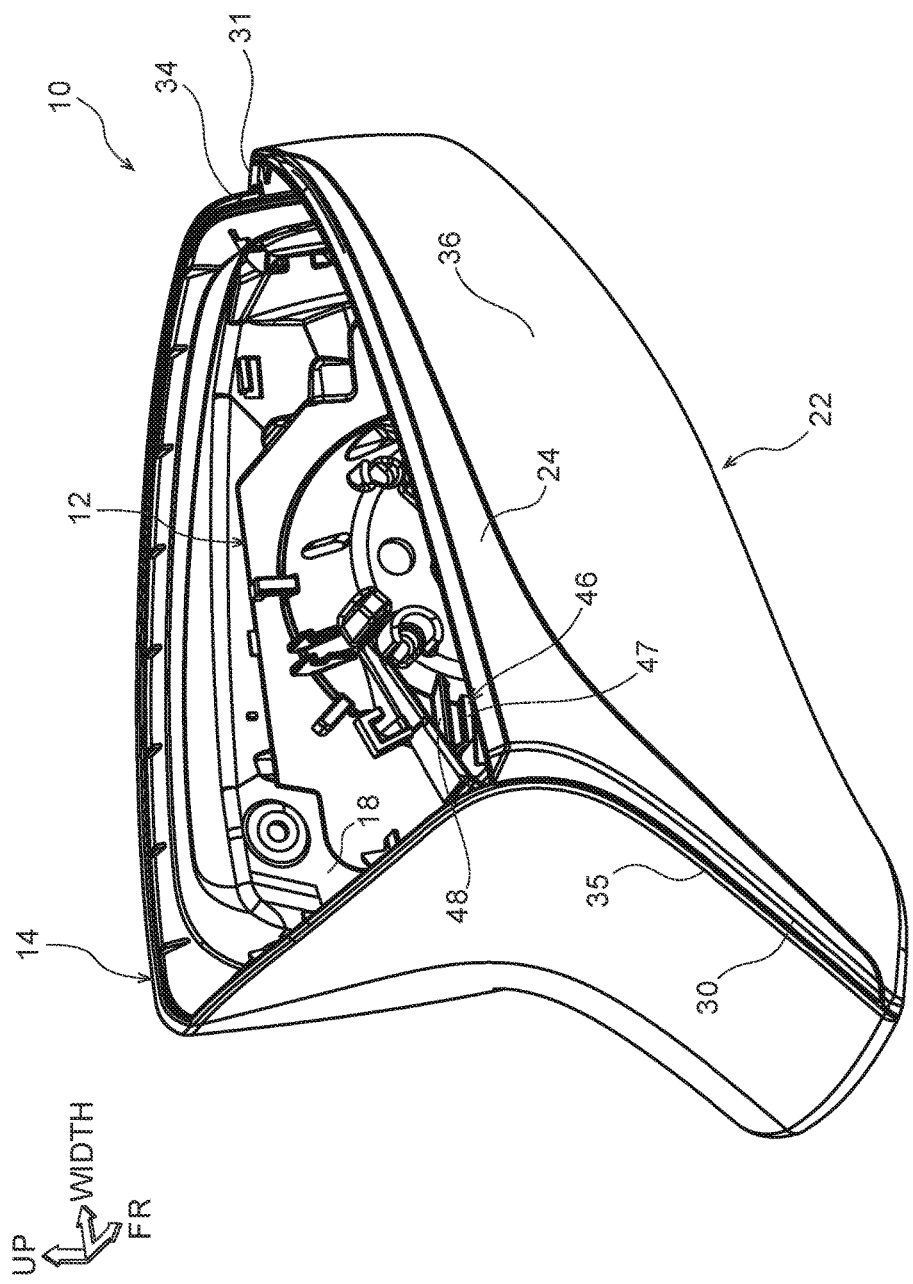
FIG. 1 is a perspective view illustrating part of a door mirror device according to an exemplary embodiment, as seen from a vehicle front side.

Explanation follows regarding an exemplary embodiment of a door mirror device, with reference to FIG. 1 to FIG. 7.

A door mirror 10, serving as a door mirror device according the exemplary embodiment, is provided at an outer portion of a vehicle door (not shown in the drawings) at an up-down direction intermediate portion of a vehicle front side end portion thereof.

As illustrated in figures, the door mirror 10 includes a substantially plate shaped bracket 12 made of resin serving as a support member configuring a first structural body. A vehicle width direction inside portion of the bracket 12 is supported by the vehicle door. The door mirror 10 is thereby supported by the vehicle door.

A substantially rectangular plate shaped mirror 100 is supported at a vehicle rear side of the bracket 12. A mirror face (surface (front face)) of the mirror is directed toward the rear side of the vehicle. A vehicle occupant (a driver or the like) is thereby able to view an area to the rear of the vehicle using the mirror.

A visor rim 14 made of resin and serving as a housing member configuring the first structural body is provided at the vehicle rear side of the bracket 12. The visor rim 14 configures a casing (visor), and has a lower rigidity than the bracket 12.

Figure 4:
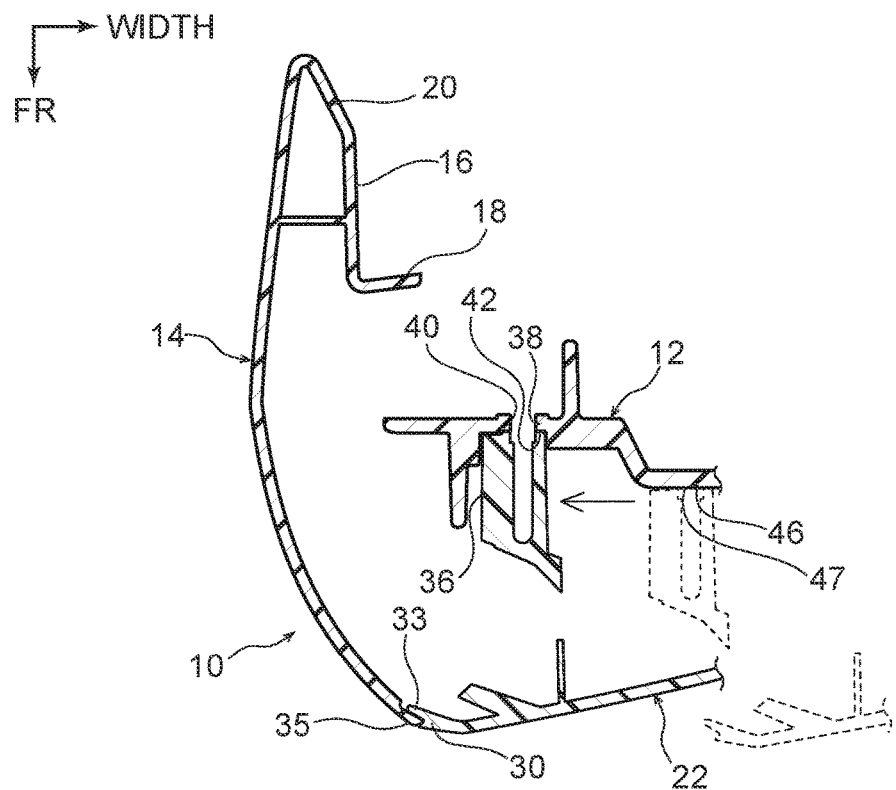
FIG. 4 is an enlarged cross-section illustrating a state sectioned along line 4-4 in FIG. 2.
Figure 5:
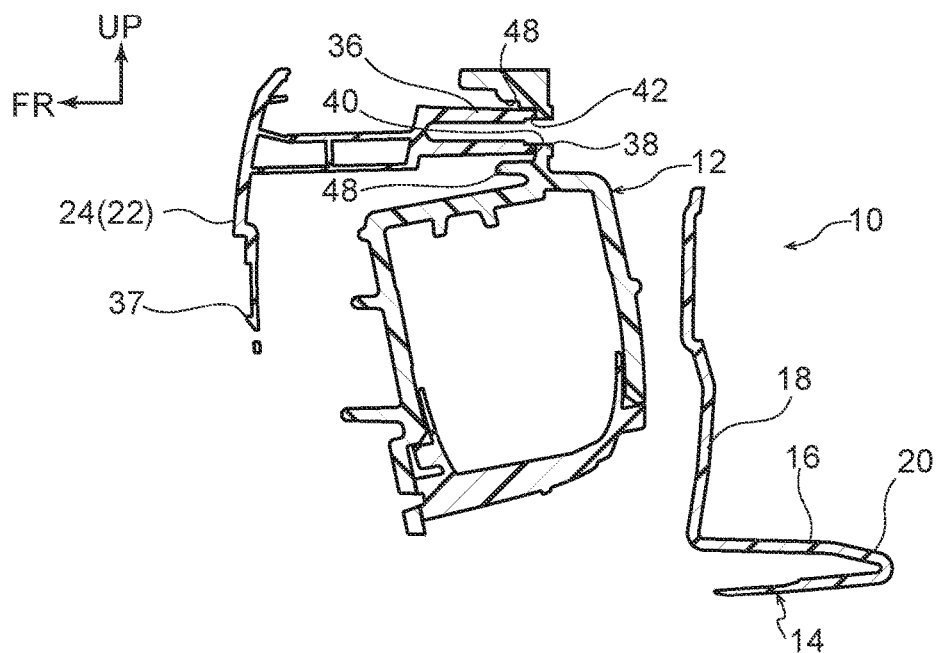
FIG. 5 is an enlarged cross-section illustrating a state sectioned along line 5-5 in FIG. 2.

As illustrated in FIG. 4, a substantially rectangular tube shaped housing tube 16 serving as a housing portion is integrally provided to the visor rim 14. A plate-frame shaped bottom wall 18 serving as a penetrate-portion is integrally provided to a vehicle front side end of the housing tube 16. The bottom wall 18 is fastened (fixed) to the bracket 12 by plural screws (not shown in the drawings) serving as an assembly member. The visor rim 14 is thereby assembled to the bracket 12. The mirror is housed inside the housing tube 16.

A peripheral wall 20 having a bent plate shape with a substantially letter J shaped cross-section is integrally provided around the entire outer periphery of the housing tube 16. The peripheral wall 20 extends out from a vehicle rear side end of the housing tube 16 toward the vehicle front side.

A substantially plate shaped visor cover 22 made of resin and serving as a second structural body is provided at a lower side portion at the vehicle front side of the bracket 12. The visor cover 22 configures the casing, has a lower rigidity than the bracket 12, and is curved in a convex shape toward the vehicle front side. Note that a second visor cover (not shown in the drawings) serving as a covering member is provided at an upper side of the bracket 12. The second visor cover configures the casing, is made of resin, and is substantially plate shaped. A turn lamp (not shown in the drawings) serving as the covering member is provided between the second visor cover and the visor cover 22. The turn lamp configures the casing, and a light emitting body is housed inside the turn lamp. The overall casing of the door mirror 10 is configured by those members.

Figure 3:
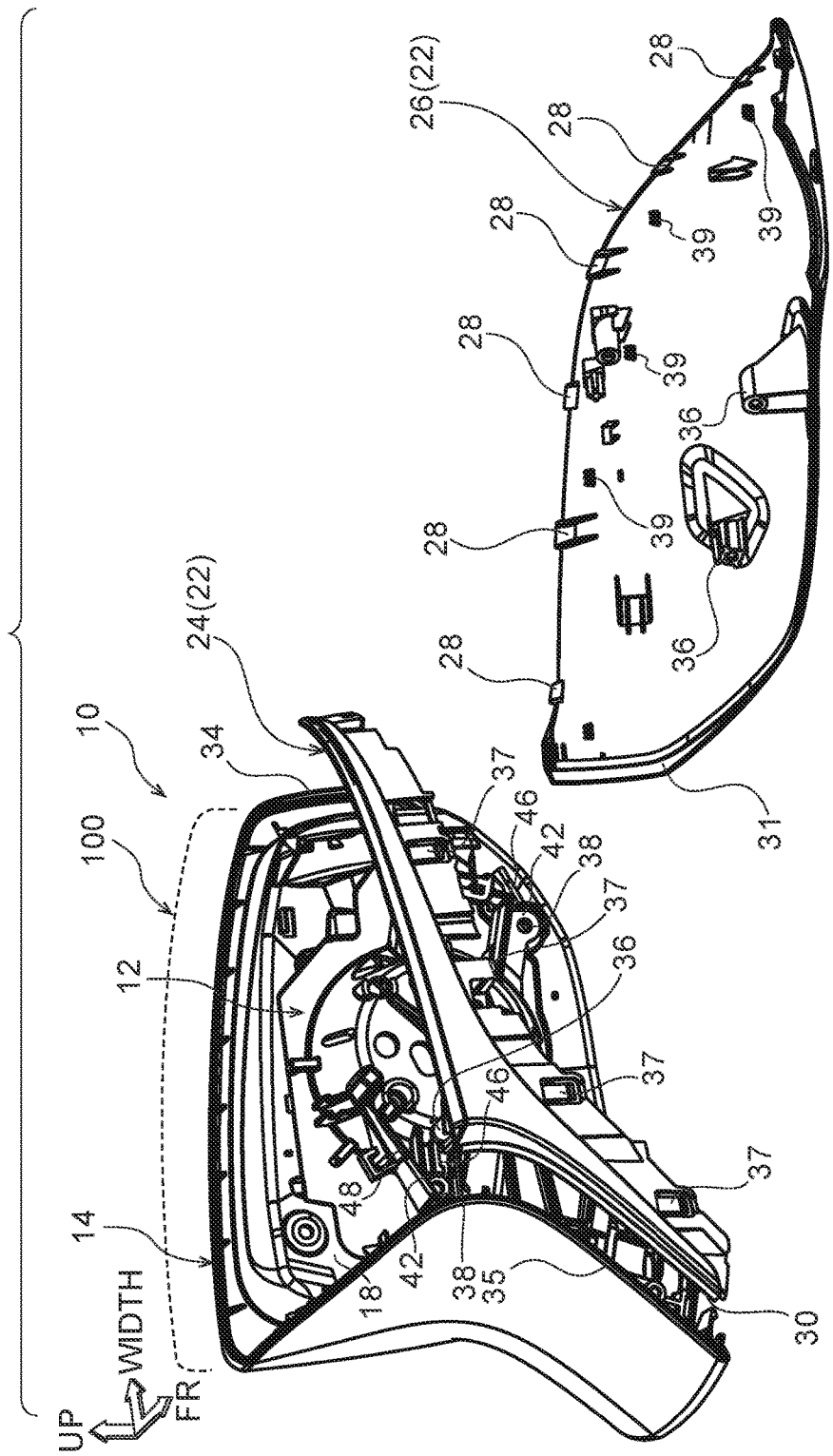
FIG. 3 is an exploded perspective view illustrating part of a door mirror device according to the exemplary embodiment.

As illustrated in FIG. 3, the visor cover 22 is configured by a plating visor 24 serving as a first covering member on an upper side and a lower visor cover 26 serving as a second covering member on a lower side. A predetermined number (four, in the present exemplary embodiment) of catch hooks (craws) 37 configuring an engagement section are integrally provided to an inner face of a lower end portion of the plating visor 24, and a predetermined number (four, in the present exemplary embodiment) of engagement portions 39 configuring the engagement section are formed to an upper end portion of the lower visor cover 26. The catch hooks 37 elastically deform to engage with the engagement portions 39. Restricting portions 28 are formed to the upper end portion of the lower visor cover 26. The lower end portion of the plating visor 24 is sandwiched between the upper end portion of the lower visor cover 26 and the restricting portions 28, in a state in which the lower end portion of the plating visor 24 and the upper end portion of the lower visor cover 26 face each other. The plating visor 24 is fastened to the lower visor cover 26. The plating visor 24 and the lower visor cover 26 are thereby joined together.

Figure 7:
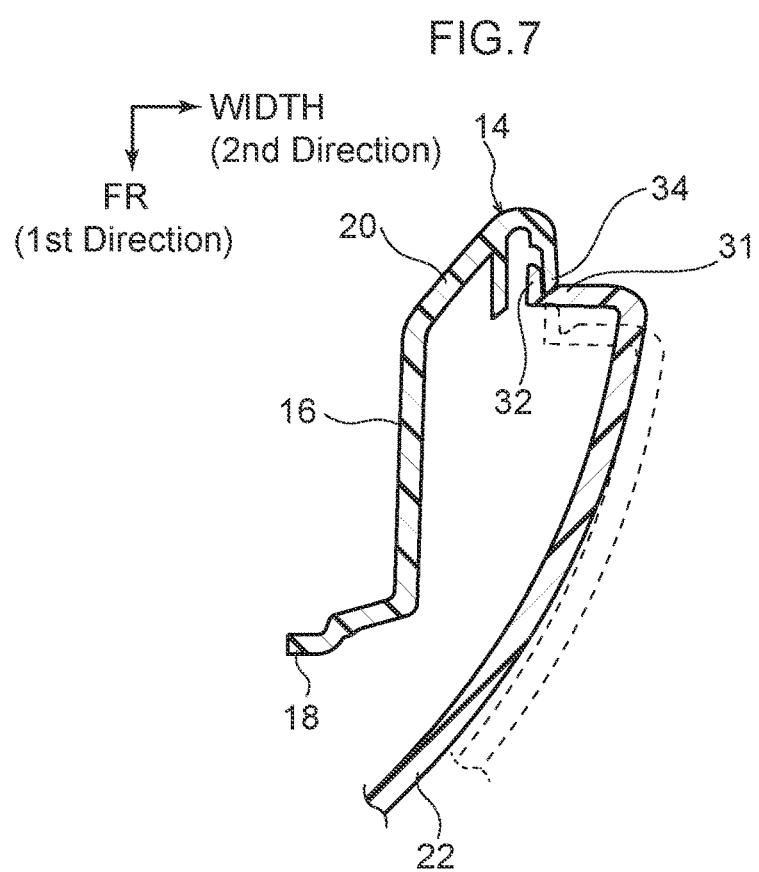
FIG. 7 is an enlarged cross-section illustrating a state sectioned along line 7-7 in FIG. 2.

As illustrated in FIG. 7, an engagement hook (claw) 32 serving as a first disposing (placement) portion is formed to an outer peripheral end portion 31 at the vehicle width direction outside of the visor cover 22. The engagement hook 32 is disposed at the back side of an outer peripheral end portion 34, serving as a first facing portion, of the peripheral wall 20 of the visor rim 14. The outer peripheral end portion 34 is an end portion of the visor rim 14 and is provided extending toward the vehicle front side. Namely, in a vehicle width direction serving as a second direction, the engagement hook 32 faces the outer peripheral end portion 34.

As illustrated in FIG. 4, an engagement hook (claw) 33 serving as a second disposing (placement) portion is formed to an outer peripheral end portion 30 at the vehicle width direction inside of the visor cover 22. The engagement hook 33 is disposed at the back side of an outer peripheral end portion 35, serving as a second facing portion, of the peripheral wall 20 of the visor rim 14. The outer peripheral end portion 35 is an end portion of the visor rim 14 and is provided extending toward substantially the vehicle width direction outside. Namely, in the vehicle front-rear direction serving as a first direction, the engagement hook 33 faces the outer peripheral end portion 35.

The engagement hooks 32 and 33 are disposed so as to overlap with respective back faces of the outer peripheral end portions 34 and 35, the visor cover 22 and the visor rim 14 are assembled such that a gap cannot form at a portion where the visor cover 22 and the visor rim 14 are joined together. Outer peripheral end portions (facing portions) and engagement hooks (claws) (disposition portions) are respectively formed to the peripheral wall 20 of the visor rim 14 and the outer peripheral end portion of the visor cover 22, at both the upper side thereof and the lower side thereof. These outer peripheral end portions and these engagement hooks are respectively connected to the outer peripheral end portions 34 and 35 and the engagement hooks 32 and 33, and face in the up-down direction.

Plural (three, in the present exemplary embodiment) circular tube shaped fixed-to portions 36 are integrally provided to an inner face of the visor cover 22. The fixed-to portions 36 project out from the inner face of the visor cover 22 toward the vehicle rear side. As illustrated in FIG. 3, one of the fixed-to portions 36 is disposed at the upper end portion of the visor cover 22, and two of the fixed-to portions 36 are disposed at the lower end portion of the visor cover 22. Namely, the fixed-to portions 36 are respectively disposed at the apex (vertex) positions of a substantially triangular shape in a vehicle face-on view.

Figure 2:
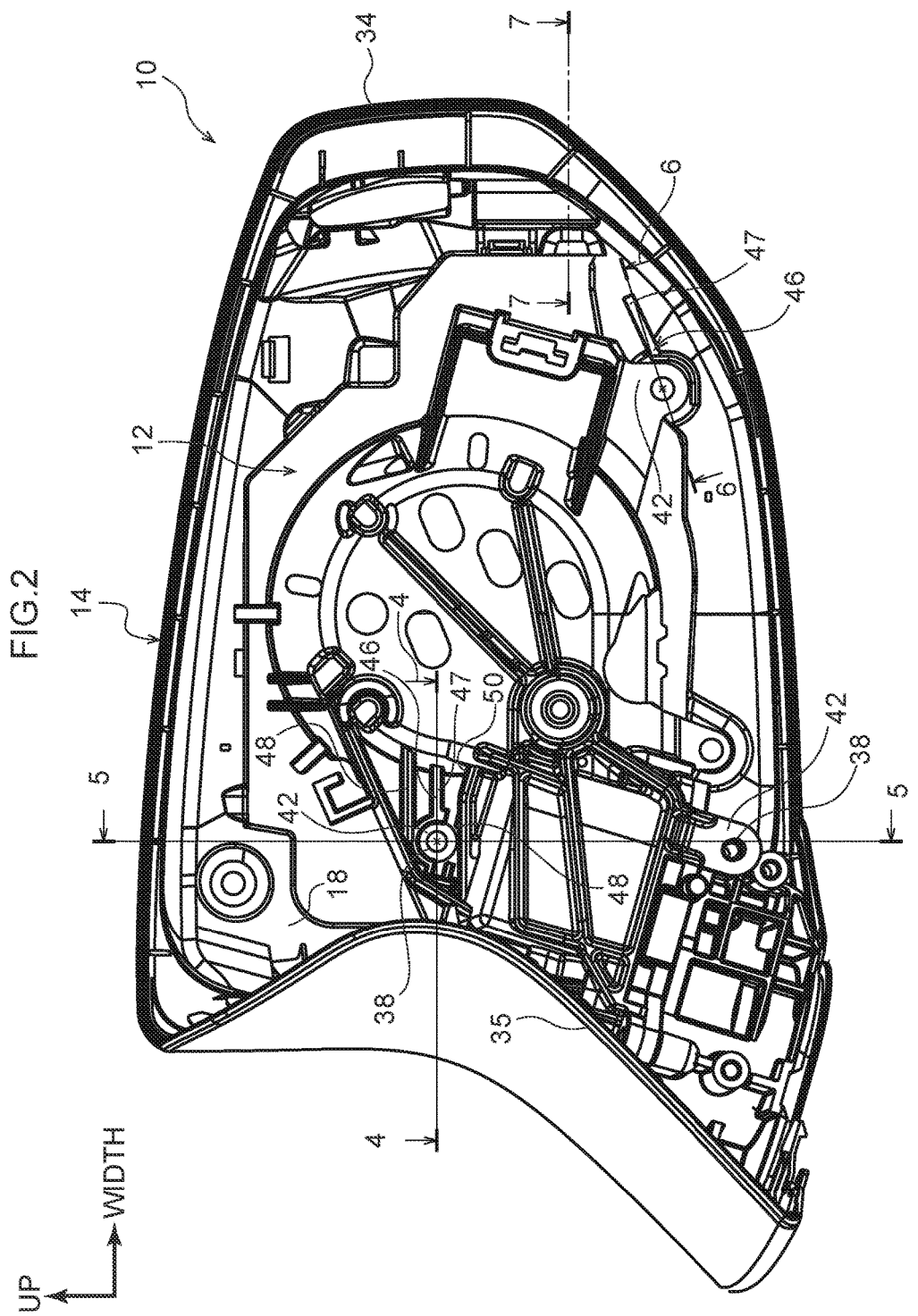
FIG. 2 is a face-on view (front view) illustrating part of a door mirror device according to the exemplary embodiment, as seen from a vehicle front side.

As illustrated in FIG. 2, plural fixing portions 38 are formed to the bracket 12. Similarly to the fixed-to portions 36, the fixing portions 38 are formed in circular tube shapes. The plural fixed-to portions 36 of the visor cover 22 are respectively fastened (fixed) to the plural fixing portions 38 by screws such that leading end faces 40 of the fixed-to portions 36 and vehicle front side faces 42 of the fixing portions 38 abut (see FIG. 4 to FIG. 6).

Figure 6:
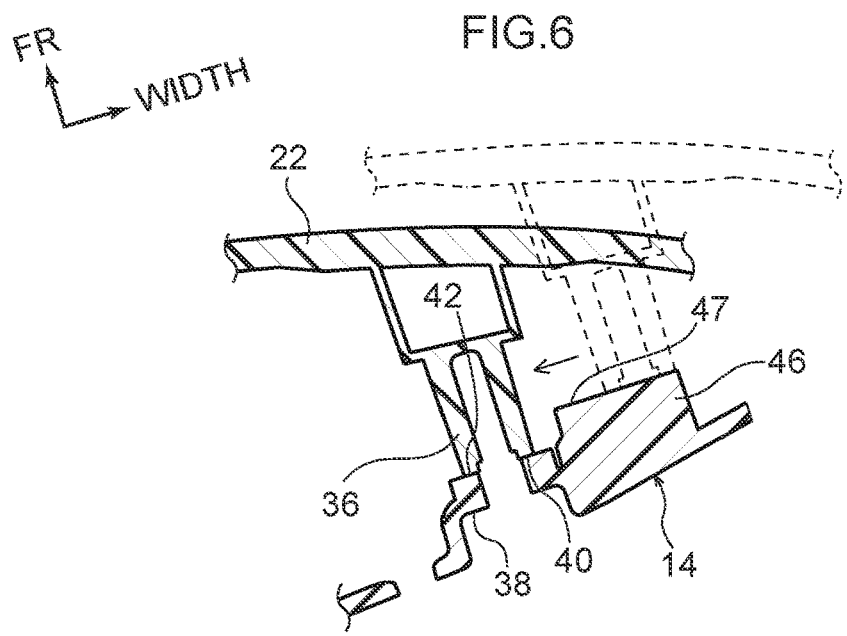
FIG. 6 is an enlarged cross-section illustrating a state sectioned along line 6-6 in FIG. 2.

Abutting portions 46 are respectively provided in the vicinity of the fixing portion 38 disposed at the upper side of the bracket 12 and the fixing portion 38 disposed at the vehicle width direction outside, at substantially the vehicle width direction outsides thereof. The abutting portion 46 in the vicinity of the fixing portion 38 disposed at the upper side is formed to the bracket 12 (FIG. 4). The abutting portion 46 in the vicinity of the fixing portion 38 disposed at the vehicle width direction outside is formed to the visor rim 14 (FIG. 6). Each abutting portion 46 is formed running (extending) substantially along the vehicle width direction and projects out toward the visor cover 22 side (the vehicle front side (in the first direction) in the present exemplary embodiment) with respect to the corresponding each fixing portion 38. The amount that the abutting portion 46 projects out toward the visor cover 22 side is set to a degree such that the engagement hook 32 is separated from the outer peripheral end portion 34 toward the vehicle front side when the leading end face 40 of the fixed-to portion 36 is caused to abut vehicle front side face 47 of the abutting portion 46. Further, the extending amount in a length direction (the substantially vehicle width direction (substantially the second direction) in the present exemplary embodiment) of the abutting portion 46 is set to a degree such that the engagement hook 33 is separated from the outer peripheral end portion 35 toward the vehicle width direction outside when the leading end face 40 of the fixed-to portion 36 is caused to abut the vehicle front side face 47 of the abutting portion 46.

Guide portions 48 are formed in the vicinity of the fixing portion 38 disposed at the upper side of the bracket 12. The guide portions 48 are respectively formed as a pair at the upper side and the lower side of the fixing portion 38 so as to sandwich the abutting portion 46, and the guide portions 48 are provided extending substantially along the same direction as the abutting portion 46 (in substantially the vehicle width direction). The projection amount of the guide portions 48 with respect to the fixing portion 38 (a dimension in the vehicle front-rear direction) is set larger than the projection amount of the abutting portion 46 with respect to the fixing portion 38. Note that in the present exemplary embodiment, a vehicle width direction outside end portion 50 of the guide portion 48 disposed at the lower side of the fixing portion 38 slopes toward the lower side on progression toward the vehicle width direction outside.

Explanation follows regarding assembling method of the door mirror 10 described above.

As illustrated in FIG. 3, the visor rim 14 is attached to the vehicle rear side of the bracket 12 in advance. Then, the visor cover 22 combining the plating visor 24 and the lower visor cover 26 is disposed at the vehicle front side of the bracket 12. Then, as illustrated by dashed lines in FIG. 4 and FIG. 6, the leading end faces 40 of the fixed-to portions 36 at the upper side and at the vehicle width direction outside of the visor cover 22 are caused to abut against the vehicle front side faces 47 of the abutting portions 46. The engagement hooks 32 and 33 thereby are in states separated from respective outer peripheral end portions 34 and 35 to the vehicle front side and the vehicle width direction outside (see the dashed lines in FIGS. 4 and 7).

Next, when the visor cover 22 is moved toward substantially the vehicle width direction inside (in substantially second direction) so as to run along the length direction of the abutting portions 46, and the fixed-to portions 36 are moved toward respective nearby (corresponding) fixing portions 38, the fixed-to portions 36 at the upper side and at the vehicle width direction outside of the visor cover 22 move from the abutting portions 46 of the bracket 12 to the fixing portions 38. The engagement hooks 32 and 33 thereby move toward the vehicle width direction inside and the vehicle rear side so as to engage with the back faces of the outer peripheral end portions 34, 35 (see FIGS. 4 and 7).

Explanation follows regarding operation and advantageous effects of the present exemplary embodiment.

In the present exemplary embodiment, when the fixed-to portions 36 are caused to abut the abutting portions 46, the engagement hook 33 is separated from the outer peripheral end portion 35 toward the vehicle width direction outside side and the engagement hook 32 is separated from the outer peripheral end portion 34 toward the vehicle front side. Accordingly, the fixed-to portions 36 are caused to abut the abutting portions 46 so as to be in the state in which the engagement hook 33 and the engagement hook 32 are respectively separated from the outer peripheral end portion 35 and the outer peripheral end portion 34, then, from the state, the fixed-to portions 36 are moved toward the fixing portions 38. The engagement hook 33 and the engagement hooks 32 are thereby respectively disposed at the back sides of the outer peripheral end portion 35 and the outer peripheral end portion 34. Rubbing of the engagement hook 33 and the engagement hook 32 against respective surfaces (which are at opposite sides to the back sides, design faces) of the outer peripheral end portion 35 and the outer peripheral end portions 34 can thereby be suppressed. Namely, scratches can be suppressed from occurring on the surface (design face) of the visor rim 14. This enables scratching during an assembly operation to be suppressed.

Since the guide portions 48 of the bracket 12 guide the fixed-to portion 36 toward the fixing portion 38, it becomes easier to dispose the fixed-to portions 36 at the fixing portions 38. Namely, it becomes easier to dispose the visor cover 22 at a preset position. This enables the ease of an assembly operation to be improved.

Additionally, three of the fixed-to portions 36 are provided to the visor cover 22, and the three fixed-to portions 36 are disposed at positions respectively forming vertices of a triangular shape in a vehicle face-on view. Accordingly, since the orientation of the visor rim 14 is stabilized in a state in which the fixed-to portions 36 are abutted against the fixing portions 38, the visor rim 14 can be fixed to the visor cover 22 and the bracket 12 in a state in which the orientation of the visor rim 14 is stable when assembling the visor rim 14 to the visor cover 22 and the bracket 12.

Note that in the present exemplary embodiment, although the abutting portions 46 are provided at substantially the vehicle width direction outsides of the fixing portions 38, there is no limitation thereto, and the abutting portions 46 may be provided at substantially the vehicle width direction insides thereof, or may be provided at other positions. Namely, the assembly direction of the visor cover 22 is not only moved from substantially the vehicle width direction outside to substantially the vehicle width direction inside. In accordance with the positions where the abutting portions 46 are provided, the assembly direction of the visor cover 22 may be set such that the visor cover 22 is moved, for example, from substantially the vehicle width direction inside to substantially the vehicle width direction outside.

Moreover, although the abutting portions 46 are provided with their length direction extending substantially along the vehicle width direction, there is no limitation thereto, and the extension direction of the abutting portions 46 may be along another direction. Namely, the assembly direction of the visor cover 22 is not only move substantially along the vehicle width direction. In accordance with the extension direction of the abutting portions 46, the assembly direction of the visor cover 22 may be configured so as to move along another direction.

Although the guide portions 48 are provided in the vicinity of the fixing portion 38 disposed at the upper side of the bracket 12, there is no limitation thereto, and the guide portions 48 may be provided to another fixing portion(s) 38.

Moreover, although the fixing portions 38 are provided to the bracket 12, there is no limitation thereto, and the fixing portions 38 may be provided to the visor rim 14 or the like. Moreover, although the first structural body is configured by the bracket 12 and the visor rim 14, there is no limitation thereto, and the first structural body may be configured by the visor rim 14 alone. Moreover, although the second structural body is configured by the visor cover 22, there is no limitation thereto, and the second structural body may include other components such as a turn lamp.

Explanation has been given regarding exemplary embodiment. However, there is no limitation to the above exemplary embodiment, and obviously various other modifications to the above may be implemented within a range not departing from the spirit of the above disclosure.

What is claimed is:

1. A door mirror device comprising:
   a first structural body that configures a casing covering a mirror provided at a vehicle door, and that is provided with a first facing portion and a second facing portion;
   a second structural body that configures the casing, and that is provided with a first disposition portion disposed at a back side of the first facing portion so as to face and engage with the first facing portion in a second direction in an assembled state of the first structural body and the second structural body and a second disposition portion disposed at a back side of the second facing portion so as to face and engage with the second facing portion in a first direction in the assembled state;
   a fixing portion that is provided at the first structural body;
   a fixed-to portion that is provided at the second structural body and that is fixed to the fixing portion; and
   an abutting portion that is provided at the first structural body and that is disposed at a location which is further toward one side in the second direction with respect to the fixing portion, the abutting portion being configured such that:
   the first disposition portion is separated from the first facing portion in the first direction and the second disposition portion is separated from the second facing portion in the second direction when the fixed-to portion is abutted to the abutting portion, and
   the first disposition portion is disposed at the back side of the first facing portion so as to engage with the first facing portion, and the second disposition portion is disposed at the back side of the second facing portion so as to engage with the second facing portion by the fixed-to portion being abutted to the fixing portion due to the fixed-to portion being moved from the abutting portion to the fixing portion.

2. The door mirror device of claim 1, further comprising a guide portion that is provided at the first structural body and that guides the fixed-to portion to the fixing portion.

3. The door mirror device of claim 2, wherein three fixed-to portions are provided at the second structural body, and are disposed at positions respectively forming apexes of a triangular shape in a vehicle front view.

4. The door mirror device of claim 1, wherein three fixed-to portions are provided at the second structural body, and are disposed at positions respectively forming apexes of a triangular shape in a vehicle front view.

5. The door mirror device of claim 1, wherein
   the first facing portion and the second facing portion are respectively outer peripheral end portions of the first structural body, the first disposition portion and the second disposition portion are respectively portions, facing respectively the first facing portion and the second facing portion, of outer peripheral end portions of the second structural body.

6. A door mirror device manufacturing method for a door mirror device comprising a first structural body that configures a casing covering a mirror provided at a vehicle door, and that is provided with a first facing portion and a second facing portion, a second structural body that configures the casing, and that is provided with a first disposition portion disposed at a back side of the first facing portion so as to face the first facing portion in a second direction and a second disposition portion disposed at a back side of the second facing portion so as to face the second facing portion in a first direction, a fixing portion that is provided at the first structural body, a fixed-to portion that is provided at the second structural body and that is fixed to the fixing portion, and an abutting portion that is provided at the first structural body and that is disposed at a second direction side of the fixing portion, the door mirror device manufacturing method comprising:

separating the first disposition portion from the first facing portion on the second direction side and separating the second disposition portion from the second facing portion on a first direction side by abutting the fixed-to portion to the abutting portion; and engaging the first disposition portion and the second disposition portion at the back side of the first facing portion and the back side of the second facing portion, respectively, by moving the fixed-to portion to the fixing portion.

* * * * *